(No Model.)
L. S. STARRETT.
MICROMETER GAGE.
No. 433,311. Patented July 29, 1890.
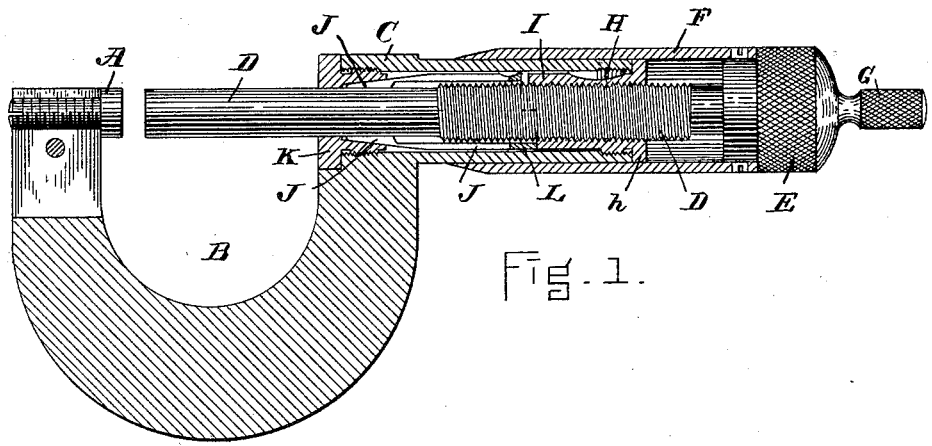
Fig. 1.
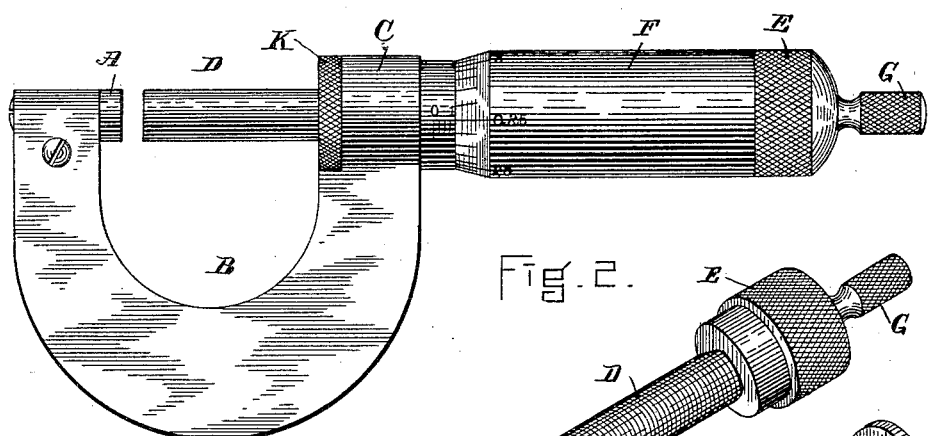
Fig. 2.
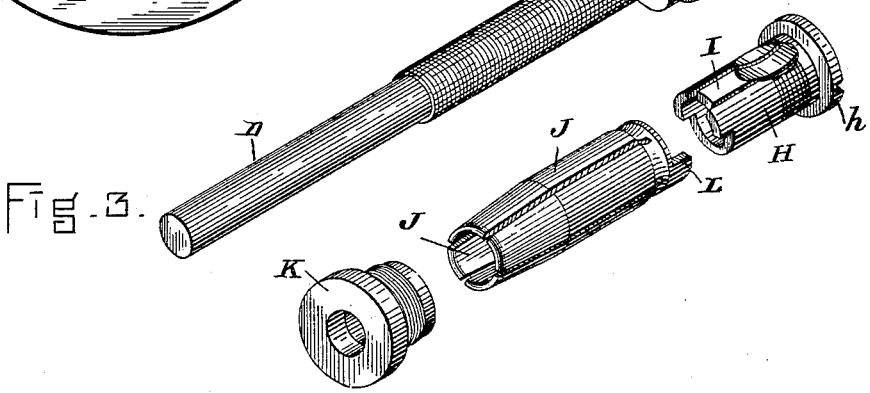
Fig. 3.
WITNESSES. 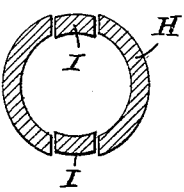 INVENTOR.
Fig. 4. Laroy S. Starrett of the content.

UNITED STATES PATENT OFFICE.

LAROY S. STARRETT, OF ATHOL, MASSACHUSETTS.

MICROMETER-GAGE.

SPECIFICATION forming part of Letters Patent No. 433,311, dated July 29, 1890.

Application filed September 2, 1889. Serial No. 322,717. (No model.)

*To all whom it may concern:*

Be it known that I, LAROY S. STARRETT, of Athol, in the county of Worcester and State of Massachusetts, have invented certain new and useful Improvements in Micrometer-Gages, of which the following, taken in connection with the accompanying drawings, is a specification.

This invention relates to the class of gages having a spindle screw-threaded at one end to engage with a corresponding thread within a stationary tubular barrel provided with longitudinal graduations, a peripherally-graduated sleeve fixed to the outer end of the spindle revolving outside of said barrel.

The object of the present improvements is to guard against backlash or lost motion in the screw-thread and compensate for wear therein, thus securing a uniform tension, and also to provide an efficient locking device to hold the spindle firmly at any desired position. I accomplish the first of these objects by means of a split bushing screwed into the outer end of the tubular barrel, such bushing being internally threaded to engage with the spindle, and having along one or both of its sides a section or tongue lying between two slots and sprung inwardly at its free end toward the axis, being thereby slightly lessened in axial length and depressed more closely into the threads of the spindle. These minute changes of position of the threads of the spring-tongues with relation to those of the rigid remainder of the bushing and of the spindle press back the threads of the spindle firmly against those of the bushing and suffice to take up automatically all end-play of the spindle, to compensate for any wear thereof, and to insure a perfect fit of the screw-threads. This bushing is prolonged by an unthreaded slotted tubular extension, forming connected spring-fingers surrounding an unthreaded part of the spindle and converging at their forward free ends and caused to grip the spindle by means of a thimble-nut screwed into the inner end of the barrel or frame and having a tapering bore which forces the prongs inwardly against the spindle.

In the drawings, Figure 1 is a longitudinal section through the sleeve, the barrel, and inclosed parts, except the spindle, which is seen in elevation. Fig. 2 is a side view of the instrument complete, while Fig. 3 represents detached the internal parts. Fig. 4 is an enlarged end view of the tongued bushing, two tongues being here represented.

The anvil A is located permanently at one end of the neck or body B, the cylindrical barrel C extending rigidly from the other end. The spindle D has an exposed cylindrical end and an inclosed screw-threaded portion, while its outer end has the milled head or cap E, terminating in a milled tip or thumb-piece G of materially less diameter than the spindle or head E, for the purpose of increasing the speed of rotation, as explained in my application Serial No. 309,584, filed May 4, 1889. The head E carries the rotating sleeve F, peripherally graduated at its beveled end, as heretofore, and the barrel has the usual straight line of graduations. (See Fig. 2.)

H represents an internally-threaded bushing with which the screw-threads of the spindle D engage. This bushing has near its outer end a short threaded portion screwing into an internal thread in the barrel C, the collar or end *h* of such bushing having a nick to facilitate screwing it into place.

Now in order to prevent any backlash whatever between the threaded spindle and the bushing, I form two slots lengthwise through one side only, or through both sides of the bushing from its inner end nearly or quite to the collar *h*, leaving between them the longitudinal tongue I, which tongue or tongues I weaken or reduce in thickness near the collar and spring inwardly at the free end, bringing each tongue or its free end somewhat nearer to the axis of the spindle than is the body of the bushing. This depression of the tongue (seen in duplicate and somewhat exaggerated in Fig. 4) causes the portion of the screw-threads formed on the inner surface of the tongue to press down with an elastic pressure into the threads of the spindle, and by the shortening tendency to draw the spindle back into close contact with the working-faces of the rigid threads of the bushing, thus making constantly a close fit. The tongue being integral with the collar *h*, its free end (when so sprung inwardly) moves in a short arc, and in a most minute degree shortens in its axial length, the sections of threads upon its inner surface being very slightly out of line with the other portions within the rigid part of the bushing. The elasticity of the tongue gives it a spring-pressure against the threads of the spindle, causing them to engage closely and without play with the threads of the bushing proper.

The remaining feature of my present improvement is illustrated in Figs. 1 and 3. A series of spring-fingers J are caused to grip the spindle by screwing an annular nut K into the inner end of the barrel, the flaring bore of the nut surrounding and forcing inwardly the tapering tips of said fingers. To do this the fingers should be held stationary within the barrel, and I prefer to so hold them by the means shown in Fig. 3. The fingers J are longitudinal sections of a thin tube slotted from one end almost to the other. A shoulder L is formed at the outer or unslotted end of this tube of a form to engage with a like shoulder at the inner end of the stationary bushing H. When the spring-fingers J are expanded in their normal position, there is just room for the spindle to revolve freely within them; but when the nut K is screwed toward said finger it surrounds their tapering free ends and forces them each toward the axis and into close contact with the cylindrical surface of the spindle, so that it is locked fast frictionally. The periphery of the nut K is milled to facilitate turning it. The proportions of the parts are such that the nut K clamps the fingers J firmly upon the spindle just before the milled end of said nut strikes the inner end of the rigid barrel C.

I claim as my invention—

1. In a micrometer-gage, the bushing H, secured within the outer end of the barrel and internally threaded to receive the spindle and formed with the depressed spring tongue or tongues I, cut away or weakened near the collar H, substantially as and for the purpose set forth.

2. In a micrometer-gage, the bushing H, externally threaded near its outer end only to screw into the barrel, internally threaded to engage the threaded portion of the spindle, and provided with one or more integral tongues I, each free at its inner end from the screw-threads of the barrel and yielding to approach the axis of the spindle, for the purpose set forth.

3. In a micrometer-gage, the combination of the barrel, the rotating spindle therein, the interposed clamping-fingers, and the annular locking-nut having an exposed milled periphery and adapted to contract said fingers around the unthreaded part of the spindle, substantially as set forth.

4. In a micrometer-gage, the unthreaded clamping-fingers, held from rotation within the barrel and converged or tapered externally at their forward free ends, in combination with the annular nut screwed into the inner end of the barrel at its junction with the covered body and adapted to compress said tapering fingers, for the purpose set forth.

5. In a micrometer-gage, the bushing H, secured in one end of the barrel and formed with a shoulder at its inner end, and the spring-fingers joined at one end in a tube shouldered to fit the end of said bushing, in combination with the barrel, the spindle, and the locking-nut, arranged substantially as set forth.

In testimony whereof I have signed my name to this specification, in the presence of two subscribing witnesses, on this 23d day of August, A. D. 1889.

LAROY S. STARRETT.

Witnesses:
GEORGE W. HORR,
OSCAR A. SCOTT.